July 7, 1931.  B. G. JENNINGS  1,812,958
TRACTOR
Filed April 18, 1929  2 Sheets-Sheet 2
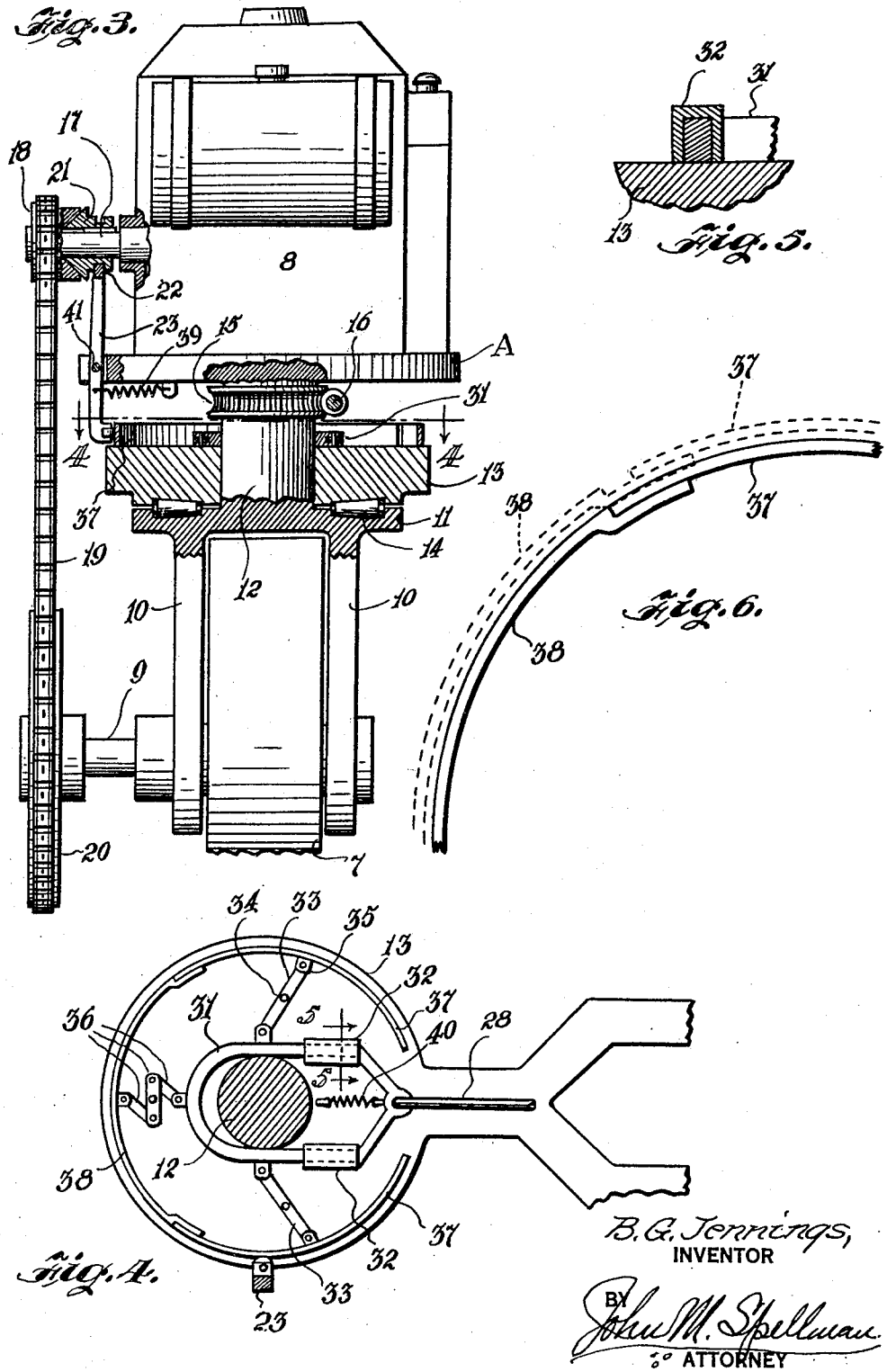
B. G. Jennings,
INVENTOR
BY John M. Spellman
ATTORNEY Patented July 7, 1931

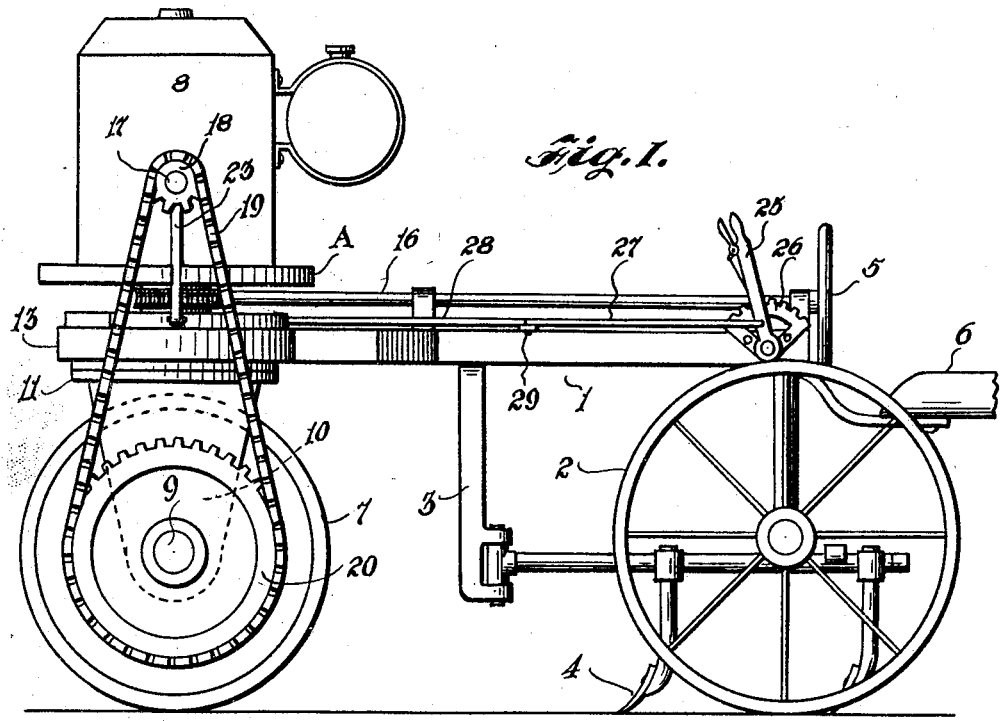
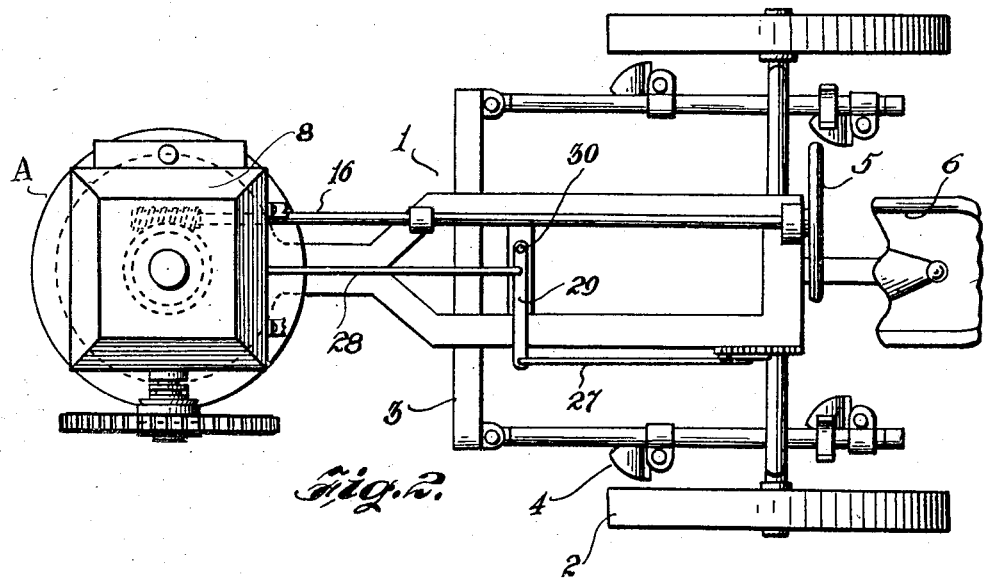

1,812,958

UNITED STATES PATENT OFFICE

BEN G. JENNINGS, OF DALLAS, TEXAS

TRACTOR

Application filed April 18, 1929. Serial No. 356,248.

This invention relates to new and useful improvements in tractors for use in farm work and soil cultivation and other uses.

The invention has for its general object to provide a tractor capable of being turned within a small area so that in tilling and cultivating a crop all corners and portions of the field can be properly worked.

More particularly the herein described tractor consists of a mechanism durably constructed and wherein as few gears as possible are used, no reverse gear being required. The machine includes a motive power comprising an internal combustion engine mounted on one wheel, whereby the engine is capable of being rotated in any direction in steering the tractor.

Another particular object of the invention is the novel and unique clutch means employed in connecting and disconnecting the motive power with the drive gear.

Other objects will become apparent as the description of the invention proceeds, reference being had to the accompanying drawings, and wherein:

Figure 1 is a side elevational view of a tractor embodying the invention,

Figure 2 is a top view thereof,

Figure 3 is an enlarged view of the steering and drive mechanism, the view being partly in section and partly broken away, Figure 4 is a horizontal sectional view taken along the line 4—4 of Figure 3, Figure 5 is a detail sectional view taken along the line 5—5 of Figure 4, and Figure 6 is an enlarged detail view in part of the segments employed in the clutch mechanism.

Having a more detailed reference to the drawings, 1 denotes generally the tractor frame mounted upon the conventional wheels 2, part of the frame including downwardly depending extensions 3 for swingably mounting cultivator shovels or the like 4. The tractor also includes a steering wheel 5, more particularly and hereinafter referred to, adjacent to which wheel is a driver's seat 6.

The forward portion of the tractor frame is mounted upon a large broad treaded wheel 7, and includes the engine 8 of any preferred type suitable for the purpose.

One of the novel features of the invention resides in the drive and steering means and for this purpose it will be observed from Figure 3 that the drive wheel 7 is mounted upon an axle 9. The axle also supports the spaced and depending elements 10 integrally formed with a circular lower plate 11 and including a centrally positioned king post or pin 12, at the top of which is formed or suitably connected an upper circular plate A. Upon the latter plate is mounted an engine 8.

From inspection of Figure 1, it will be apparent that the forward portion 13 of the frame is circular in shape and that it is provided with a central opening through which the king post 12 projects. Interposed between the plate 11 and forward frame portion 13 are roller bearings 14 for enabling the engine and parts to be rotated as freely as possible. For this purpose, upon the king post is placed a worm gear 15, in meshed relation with a worm shaft 16, whereby the engine 8 and wheel 7 may be rotated in any direction in steering the machine.

One of the particular features of the invention resides in the novel arrangement of parts for connecting and disconnecting the motive power from the engine and also in effecting a backward travel of the machine without the use of a reverse gear. The engine crank shaft 17 includes a drive gear 18 connected by chain 19 to a large gear 20 supported by the axle 9. A friction clutch 21 is keyed to and slidably mounted upon the crank shaft 17, clearly shown in Figure 3, the clutch co-acting with a recess in the body of the drive gear 18 when the clutch is in engagement. The clutch also includes an annular recess for the reception of a yoke 22 formed on a vertical yoke arm 23, whereby when the arm is actuated the clutch will be slid along the crank shaft to engage or disengage the motive power. This arm 23 is operated from the driver's seat through the mechanism shown in Figure 4 and a lever 25 pivoted to a conventional segment 26. A rod 27 is connected to the lever 25 as shown in Figure 1 and a similar rod 28 is disposed in parallel relation to rod 27. The two rods 27 and 28, shown clearly in Figure 2 have their inner ends pivoted to a link 29, loosely connected to the frame at 30. From the foregoing it will be apparent that an inward movement of the lever 25 will cause the rods 27 and 28 to slide forward and vice versa.

Referring now to Figure 4, the outer end of rod 28 is attached to a yoke 31, embracing the king post 12, the yoke arranged to slide in the members 32, affixed to the plate 13. There are provided also a series of links 33 centrally pivoted at 34 to plate 13 and to the opposite sides of the yoke at 35, and also a plurality of forward links 36 pivoted to each other, and one link connected to the yoke at the rounded portion thereof.

Supported upon the plate 13 are several segments 37, and 38, shown also in Figure 6. One of the links 36 is pivoted to segment 38 and both links 33 are similarly connected to the segments 37.

The yoke arm 23 is connected to segment 37 and includes a spring 39 to assist in holding the arm 23 against the clutch when the latter is in operative engagement with the gear 21. There is also included a spring 40 on the yoke for preventing a dead-center position of the links 33. The segment 38 is recessed at both ends to provide an overlapping effect with the segments 37, shown more clearly in Figure 6.

In operation of the tractor, the steering wheel 5 will enable the engine and wheel 7 to be rotated to the right or left and make sharp turns effectively. The tread of the wheel 7 can be turned at right angles to the frame and a corner in a field easily worked by the shovels 4, and the tractor can thus also be turned completely around within a small area by rotating the drive wheel at right angles to the frame, hence a reverse gear is not required.

Following the preceding explanation of the mechanism for disconnecting and connecting the motive power, it will be apparent that when the lever 25 is moved forward which position it occupies in Figure 1, that the rod 28 will move the yoke 31 forward. This will draw the segments 37 and 38 together, their normal inoperative position being partly shown by the broken line position in Figure 6. The forward links 36 then assume the position in Figure 4. When the segments are thus moved inwardly the arm 23, being pivoted at 41 to the upper plate A, will move the yoke arm 23 outward and throw the clutch 21 into engagement with the drive gear 8. A reverse movement of the lever 25 will of course spread the segments 37 and 38 apart to the broken-line position shown in Figure 6. The yoke arm 23 will then be moved outward at its lower end, resulting in an inward movement of the clutch to cut off the power.

While a practical and operative embodiment of the invention is herein disclosed, it is obvious that the invention is capable of modifications and changes, such as will come within the scope and meaning of the appended claims.

What is claimed as new is:

1. A tractor comprising a framework having a forwardly extending portion of circular shape; a circular plate having spaced elements and supporting said forwardly-projecting portion of the framework; roller bearings interposed between said framework and plate; a king post on the plate; an upper plate carried by the king post, an engine mounted on the upper plate, the crank shaft of the engine having a drive gear and a clutch member engageable therewith; means establishing operable connection between the drive gear and the axle to rotate the front wheel; and including means mounted upon said forwardly-extending portion of the framework for operating the clutch.

2. A tractor comprising a framework of rearwardly-disposed and spaced parallel bars, said bars converging at a point forwardly and providing a reduced portion or neck, the forward end portion of the framework beyond the neck being circular in shape; a plate disposed underneath the forward end portion of the framework and provided with roller bearings whereby the framework is revolubly supported; an axle and drive wheel supporting the plate; a king post formed integrally with the plate and projecting upwardly through the forward end portion of the framework and carrying an upper plate with an engine mounted on the upper plate; a worm gear on the upper end of the king post, a steering shaft in mesh with the gear; gear means for connecting the axle with the crank shaft of the engine; a clutch member carried by the forward end portion of the framework, a clutch on the crank shaft of the engine, and a lever for operating the clutch member to engage and disengage the clutch.

In testimony whereof I affix my signature.

BEN G. JENNINGS.